US008636197B1

(12) United States Patent
Hill et al.

(10) Patent No.: US 8,636,197 B1
(45) Date of Patent: Jan. 28, 2014

(54) BONDING OF ROOF PANELS (71) Applicant: Ford Global Technologies, LLC, Dearborn, MI (US)

(72) Inventors: David John Hill, Ann Arbor, MI (US); Stephen William Gallagher, Bloomfield Hills, MI (US); Shawn Michael Morgans, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/645,431

(22) Filed: Oct. 4, 2012

(51) Int. Cl.
*B23K 11/11* (2006.01)
*B32B 37/00* (2006.01)

(52) U.S. Cl.
USPC ............................ 228/175; 156/60; 219/86.1

(58) Field of Classification Search
None
See application file for complete search history.

(56) References Cited

U.S. PATENT DOCUMENTS

| | | | | |
|---|---|---|---|---|
| 4,293,161 A | * | 10/1981 | Lutz | 296/213 |
| 4,452,483 A | * | 6/1984 | Kano et al. | 296/213 |
| 4,471,519 A | | 9/1984 | Capello | |
| 4,618,181 A | * | 10/1986 | Tokuda et al. | 296/191 |
| 5,795,014 A | | 8/1998 | Balgaard | |
| 5,968,298 A | * | 10/1999 | Staquet et al. | 156/98 |
| 6,025,438 A | * | 2/2000 | Hinterwaldner et al. | 525/112 |
| 6,578,909 B1 | * | 6/2003 | Reed et al. | 296/210 |
| 7,429,713 B2 | | 9/2008 | Wang | |
| 2002/0076566 A1 | * | 6/2002 | Brandys et al. | 428/458 |
| 2003/0057402 A1 | * | 3/2003 | Schneck | 252/500 |
| 2003/0144416 A1 | * | 7/2003 | Tarbutton et al. | 525/65 |
| 2004/0150242 A1 | * | 8/2004 | Heilmeier et al. | 296/29 |
| 2005/0000609 A1 | * | 1/2005 | Butler et al. | 148/702 |
| 2005/0016677 A1 | * | 1/2005 | Carlson et al. | 156/330 |
| 2005/0116509 A1 | * | 6/2005 | Ido et al. | 296/210 |
| 2005/0140158 A1 | * | 6/2005 | Ogawa et al. | 296/29 |
| 2006/0006683 A1 | * | 1/2006 | Kaneda et al. | 296/1.03 |
| 2006/0055209 A1 | * | 3/2006 | Hoshino | 296/203.03 |
| 2006/0237997 A1 | * | 10/2006 | Wendler et al. | 296/193.04 |
| 2006/0255627 A1 | * | 11/2006 | Hirotani et al. | 296/214 |
| 2007/0057537 A1 | * | 3/2007 | Barutzky et al. | 296/210 |

(Continued)

FOREIGN PATENT DOCUMENTS

| | | | |
|---|---|---|---|
| DE | 102004001523 A | * | 8/2005 |
| ES | 8404932 A1 | | 9/1984 |
| JP | 04-183882 A | * | 6/1992 |
| JP | 2009-1090050 A2 | | 8/2009 |

OTHER PUBLICATIONS

"Weld Bonding a 55-59 Chevy Truck Roof", http://www.thehollister-roadcompany.com/taskforceroof.html; Main website copyright dated 2010.

(Continued)

*Primary Examiner* — Kiley Stoner
(74) *Attorney, Agent, or Firm* — O'Brien Jones PLLC; Jason Rogers (57) ABSTRACT

A method for attaching a roof panel to a roof rail of a vehicle bodyside frame, wherein the roof rail prohibiting access to an underside of an area at which the roof panel attaches to the roof panel, can include applying a single-component adhesive to a roof rail or to a portion of a roof panel that rests on the roof rail, placing the roof panel onto the roof rail, attaching the roof panel to the roof rail using single-sided spot welds, and heating the roof panel and vehicle bodyside frame to a temperature that cures the single-component adhesive.

21 Claims, 5 Drawing Sheets

(56) References Cited

U.S. PATENT DOCUMENTS

| | | | |
|---|---|---|---|
| 2007/0176467 A1* | 8/2007 | Watanabe et al. | 296/210 |
| 2007/0252414 A1* | 11/2007 | Bohm | 296/210 |
| 2008/0083498 A1* | 4/2008 | Handing | 156/322 |
| 2008/0224173 A1* | 9/2008 | Yuan et al. | 257/194 |
| 2009/0036595 A1* | 2/2009 | Kohlstrung et al. | 524/571 |
| 2009/0051149 A1* | 2/2009 | Kalandek et al. | 280/730.2 |
| 2009/0163649 A1* | 6/2009 | Sasaki et al. | 524/589 |
| 2009/0230733 A1* | 9/2009 | Sugimura et al. | 296/216.07 |
| 2009/0294411 A1 | 12/2009 | Khakhalev | |
| 2010/0066060 A1* | 3/2010 | Kalandek | 280/728.2 |
| 2010/0117405 A1* | 5/2010 | Kimizuka et al. | 296/214 |
| 2010/0259073 A1* | 10/2010 | Gruneklee et al. | 296/225 |
| 2010/0327620 A1* | 12/2010 | Shah et al. | 296/102 |
| 2011/0163571 A1* | 7/2011 | Furusako et al. | 296/193.06 |
| 2011/0252719 A1* | 10/2011 | Wallance | 52/79.5 |
| 2012/0061998 A1* | 3/2012 | Carsley et al. | 296/210 |

OTHER PUBLICATIONS

Johnny Larsson, "Structural Adhesive Bonding", thefabricator.com, Laser Welding Article May 8, 2007.
"Resistance Spot Welding and Mag Welding", SSP 383 Audi TT Coupe '07-Body; Self Study Program-VAG-301 to 400, Material Oficial VW AG, Oct. 21, 2009.
ES-8404932A1 English Abstract.

* cited by examiner

BONDING OF ROOF PANELS

TECHNICAL FIELD

The present teachings relate generally to attachment of a roof panel to a vehicle body structure. More specifically, the present teachings relate to attachment of a roof panel to a vehicle body structure using an adhesive and a supplemental attachment mechanism such as single-sided spot welds.

BACKGROUND

Attachment of roof panels to a vehicle body structure using continuous welding can offer certain advantages over traditional two-sided resistance spot welds. In additional to potential aesthetic improvements, continuous welding also allows for an enhanced design of the supporting structure beneath the roof by eliminating a need for weld access holes (conventional welding can require access to both sides of the members that are welded together), larger sections, and hydroformed tubes. If a company chooses to move toward a uniform global design vehicle, a single manufacturing process can be preferable to achieve such a uniform global design. Continuous welding, however, can require a large production-line investment or shop floor space that may not be practical for production in low-volume markets or small production plants, respectively. In such situations, it would be desirable to have a low-investment alternative joining strategy that can use standard panels without modification.

Adhesive has been used for roof panel attachment in certain aftermarket roof modifications. For example, companies specializing in modifying and customizing vehicles for specific needs often replace the standard steel roof panel. Examples include composite high roofs for disability vehicles, or composite roofs for increased cargo/recreational uses. These aftermarket modifications are typified by room temperature curing of two-component polyurethane, epoxy and acrylic adhesives. Assembly time and thus cure cycle time is usually not an issue due to the low volumes.

Adhesive has also been used for roof panel attachment when the roof panel is adhered to the frame after the vehicle has been painted and sealed. For example, the 2008 BMW® 7 series has an aluminum roof bonded to a steel body. The roof panel is positioned on the vehicle in the body shop using temporary stand-off fixtures. The gap these stand-off create allow for e-coat and paint coverage. The body color roof panel is then removed from the stand-offs in trim and final and bonded on using a low modulus two-component polyurethane adhesive. Induction heating is incorporated into the robotic handling fixture to accelerate the cure rate. Problems associated with high temperatures and differential expansion rates between the aluminum roof and steel body are avoided because the roof is attached after paint. The concept is similar to a bonded glass roof (e.g., on the 2009 Ford® Mustang). Aston Martin® uses a similar technique to BMW® for their DB9 and V8 Vantage models, although instead of an induction heating system, they use hot air impingement heating to accelerate the cure of the adhesive.

Adhesives have been used previously to augment conventional spot welds as a primary attachment means. One example is the 2004 Ford® F150, in which an adhesive was added between the 300 mm weld pitch to help with panel stiffness, durability, and reduction of noise, vibration, and harshness (NVH). The 2011 Range Rover® Evoque used a 6111-T4 aluminum roof rivet-bonded to a steel body. A heat activated, single-component, highly flexible adhesive (e.g., a Henkel Terostat 5192 adhesive) was used along with self-pierce rivets. The adhesive cured within the e-coat bake oven. Expansion problems were overcome by selective rivet placement on a 100 mm pitch and feature-lines within the roof panel to minimize permanent offset upon adhesive cure. A low modulus expanding anti-flutter mastic was also selected to minimize read-through. The self-piercing rivets employed in the Evoque required access from both sides like a conventional two-sided spot weld gun. Access holes for self-piercing rivets are actually larger than what is required for spot weld access, which can introduce water leaks.

The increased use of laser welded roofs has led to the increased use of adhesives to repair or replace them within the field. Laser welding is typically not feasible within repair shops, and other manual continuous welding processes can lead to excessive distortion when trying to weld a thin (0.7 mm) roof to a thick roof rail. Repair procedures for the Cadillac® SRX & CTS specify the use of several two-component adhesives to replace roof panels on their 2006 and later models. Ford® Europe specifies the use of a two-component epoxy adhesive for the field replacement of the laser-welded Mondeo wagon roof panel. The in-plant repair of defective laser welded roofs for the Ford® F150 specified the use of stitch welds via a single-sided welder and recommends that a two-component epoxy adhesive is spread over the roof panel to bodyside joint to fill any cracks between the welds, preventing the subsequent leakage of a flowable ditch sealer.

SUMMARY

The present teachings may solve one or more of the above-mentioned problems and/or may demonstrate one or more of the above-mentioned desirable features. Other features and/or advantages may become apparent from the description that follows.

In accordance with at least one exemplary embodiment, the present teachings provide a method for attaching a roof panel to a roof rail of a vehicle bodyside frame, wherein the roof rail prohibiting access to an underside of an area at which the roof panel attaches to the roof panel, can include applying a single-component adhesive to a roof rail or to a portion of a roof panel that rests on the roof rail, placing the roof panel onto the roof rail, attaching the roof panel to the roof rail using single-sided spot welds, and heating the roof panel and vehicle bodyside frame to a temperature that cures the single-component adhesive.

In accordance with at least another exemplary embodiment, the present teachings provide a method for assembling a vehicle that includes assembling a vehicle bodyside frame, applying a single-component adhesive to at least one of a body side panel of the vehicle bodyside frame and a roof panel, putting the roof panel on the vehicle bodyside frame, attaching the roof panel to the vehicle bodyside frame, e-coating the assembled vehicle with an e-coat, and baking the assembled vehicle at a temperature of more than approximately 150° C. for approximately 5 minutes to approximately 1 hour to cure the single-component adhesive.

Additional objects and advantages of the present teachings will be set forth in part in the description which follows, and in part will be obvious from the description, or may be learned by practice of the present disclosure and/or claims. At least some of those objects and advantages of the invention will be realized and attained by means of the elements and combinations particularly pointed out in the appended claims.

It is to be understood that both the foregoing general description and the following detailed description are exemplary and explanatory only and are not restrictive of the present disclosure and claims, which are entitled to their full breadth of scope including equivalents.

BRIEF DESCRIPTION OF THE DRAWINGS

At least some features and advantages of the present teachings will be apparent from the following detailed description of embodiments consistent therewith, which description should be considered with reference to the accompanying drawings, wherein.

Although the following detailed description makes reference to illustrative exemplary embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various embodiments, examples of which are illustrated in the accompanying drawings. The illustrated exemplary embodiments are not intended to limit the disclosure. To the contrary, the disclosure is intended to cover alternatives, modifications, and equivalents.

The present teachings contemplate a vehicle assembly method and system comprising assembling a vehicle bodyside frame, putting an adhesive on body side panels of the vehicle bodyside frame or on a roof panel, putting the roof panel on the vehicle bodyside frame, attaching (e.g., via single-sided spot welding) the roof panel to the vehicle bodyside frame, e-coating the assembled vehicle, and baking the assembled vehicle at a temperature of, for example, approximately 150° C. to approximately 230° C. for a time period ranging, for example, from approximately 5 minutes to approximately 1 hour. According to another exemplary embodiment, the assembled vehicle frame may be baked at a temperature of more than approximately 150° C. to approximately 171° C. for a time period ranging from approximately 5 minutes to approximately 10 minutes. According to another exemplary embodiment, the assembled vehicle frame may be baked at a temperature of from approximately 150° C. to approximately 230° C. for approximately 5 minutes to approximately 10 minutes.

The present teachings contemplate attachment of a roof panel or similar thin panel to a vehicle frame via adhesive as an alternative to or in addition to continuous welding as a primary method for attaching the panel to the vehicle frame. A single-sided spot weld or other mechanical fastener can be used with the adhesive as an enabler to advantageously allow the adhesive to cure sufficiently in a bake oven, without requiring access to both sides (i.e., upper and lower surfaces) of the roof ditch and without using a projection weld that may require a separate roof panel that is thick enough for use with a projection weld. Further, the present teachings contemplate the use of a standard panel in a joining operation described above to a frame via adhesive. For example, while the standard panel may have been designed to be joined to a frame via a welding operation, such as a laser welding operation, such a standard panel may be advantageously used in the adhesive joining operation in accordance with exemplary embodiments of the present teaching without having to modify the panel.

The present teachings contemplate an adhesive that cures at temperatures greater than approximately 150° C., and single-sided spot welds or another type of mechanical fastener (e.g., screws, bolts, other adhesives, other spot welds, rivets, etc.) that can be utilized to help ensure that an adhered panel is properly positioned on the vehicle frame until and while the adhesive cures to permanently attach the panel to the vehicle frame. A single-sided spot weld is selected herein as an exemplary means of attachment prior to adhesive curing because it an inexpensive and readily available attachment method. One skilled in the art, however, will understand that many other types of fasteners can be used to hold the panel to the vehicle frame before and during curing of the adhesives. A proper number and placement of the single-sided spot weld or other mechanical fastener can also keep the adhesive joint and the panel from buckling while the adhesive is cured.

During assembly, a vehicle is typically assembled, for example by construction of a frame and application of a panel (e.g., a roof panel) thereto. After application of the panel to the frame via, for example, welding or adhesive, the vehicle is electrophoretically painted ("e-coated"). The e-coat can then be baked at a temperature of, for example, at least about 150° C. Thereafter, a sealer can be applied and the vehicle can be baked at, for example, a lesser temperature that the first bake. Afterward, primer and paint can be applied and the vehicle can be baked a third time, for example at a temperature of less than the first and second bake.

In accordance with various embodiments of the present teachings, a single-component adhesive is utilized to bond the panel to the frame. The single-component adhesive is preferably toughened. Toughness can be defined by, for example, peel strength or load strength of the adhesive in a peel mode. Peel strength is typically the measure of the average force to separate two bonded materials like tape, metal, textile or plastic films. Peel strength is calculated during a peel test at a constant speed rate by dividing the average force required during the test by the unit width of the bonded samples. Depending on materials, norms, and products, the tests can be done with different angles such as 90° and 180°. Like friction, peeling is a discontinuous phenomenon: there are peaks and plateaus. It is the start peak which is generally used to characterize the peel strength. In the case of adhesive materials, however, it is preferable not to use the start peak peel strength, but rather to use the plateau peel strength or a measure the average force during the test divided by the width of the sample to obtain a resistance value, for example measured in pounds per inch, joules per meter, Newtons per meter, or Newtons per inch. An adhesive in accordance with a preferred embodiment of the present teachings can have a peel strength of, for example, about 50 Newtons per one-inch wide strip or 2000 Newtons per meter.

In certain embodiments, the adhesive is a heat-activated and toughened adhesive, typified by single-component adhesive systems, including but not limited to, for example, single-component epoxy-based adhesives and single-component butyl-based adhesives. Exemplary suitable adhesive systems can work well on the uncoated steel of a typical roof panel and on lubricated portions of the frame and panel. Exemplary single-component epoxy-based adhesive systems include a Uniseal® 2388 adhesive or a Coat-It® 5698 structural epoxy adhesive. The adhesive preferably has a chemistry that is similar to, or the same as, the electrophoretic paint, so that they may cure under the same conditions. The adhesive can alternatively or additional be a pumpable, single-component, thermal curing, weldable epoxy resin base, structural adhesive for steel. The lack of cure of single-component adhesives at room temperature makes them more suitable for welding through (e.g., single-sided weld bonding) than two-component adhesives that begin curing at room temperature.

An adhesive in accordance with various embodiments of the present teachings can be used to bond oily, unclean cold rolled and galvanized steel for body-in-white applications. The present teachings contemplate obtaining a desirable adhesion strength and bond durability with an adhesive bond line of 0.25 mm and the use of galvanized or cold rolled steel. The adhesive curing schedule can include, for example, curing at 171° C. metal temperature for 10 minutes and/or curing at 205° C. metal temperature for 30 minutes.

A two-component epoxy adhesive can be less advantageous than a single-component epoxy adhesive for use in an attachment method of the present teachings, because it can fail or become weakened during the heating processes that occur subsequent to adhesion of the roof panel to the vehicle frame. However, the embodiments described herein are not limited to a single-component epoxy adhesive and other adhesives, such as single-component or two-component adhesives may be used.

Embodiments of the present teachings provide a low-cost alternative to laser welding for use where a laser welding cell is not cost effective, the alternative comprising, for example, a single-sided resistance spot weld and structural adhesive. In certain embodiments, only a few welds are required, for example, about 5-8 welds per side, or for example, about 6 welds per side, are used. The welds function primarily as manufacturing aids through an electrocoat (e-coat) bake oven. The pitch between the welds can be, for example, greater than about 300 mm. In another example, the pitch between welds may be approximately 370 mm or more. The principle loading within the roof joint can be handled by a structural adhesive rather than by the single-sided spot welds.

In an exemplary embodiment, a single-component, heat-activated adhesive was dispensed along either side of a roof panel or vehicle structure, for example a roof panel of a 2011 Ford® Explorer. The roof panel can then be located onto the vehicle frame using a fixture or an alignment pin (also referred to as a temporary locator pin) within a roof rack bolt hole (see, for example, FIG. 5 as described below). In the illustrated embodiment, only one alignment pin is utilized per roof panel side; although the present teachings contemplate using any number of alignment pins and even the use of no alignment pins. In various embodiments of the present teachings, a welder such as, for example, an ARO Mid Frequency Direct Current (MFDC) Ergowelder can be used to generate single-sided spot welds through the adhesive within a roof ditch of the vehicle. In certain embodiments, sufficient pressure can be applied to the weld tip by manually leaning on it to displace the adhesive and form a suitable weld. A variety of spot welds, such as traditional circular spot welds with a traditional truncated cone tip, can be used when consistent with the vehicle geometry (e.g., the vehicle's roof ditch geometry). Alternatively or additionally, a narrow "spade"-style electrode can be utilized when there is insufficient room for a traditional truncated cone tip. In an exemplary embodiment of a Ford 2011 Ford® Explorer, a weld pitch of about 370 mm can be utilized, resulting in, for example, seven welds per side.

Figure 6:
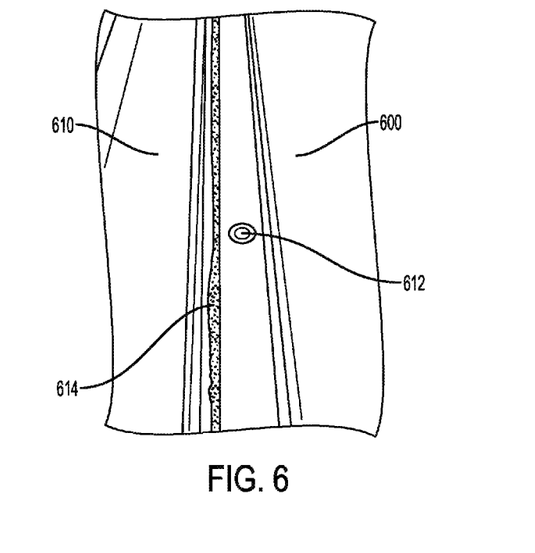
FIG. 6 is a partial view of an exemplary embodiment attachment of a roof panel to a vehicle bodyside frame.

Any adhesive that escapes from a joint and into the roof ditch of the vehicle, as shown in FIG. 6 (described in more detail hereinbelow), can be removed. The present teachings contemplate optimization of adhesive volume and placement to reduce or eliminate adhesive that escapes from the joint. In a preferred embodiment of the present teachings, a single-component (also referred to as a single component or 1K) adhesive is utilized, such as a single-component toughened adhesive. A single-component adhesive undergoes less stress within the joint at the e-coat bake temperature, causing the adhesive to maintain its integrity while being cured at high temperatures experienced during vehicle assembly, coating, and painting. In certain embodiments, a flowable sealer can then be applied to the roof ditch (or other location for the adhesive joint) to provide water integrity. It is also contemplated that the adhesive used beneath the roof panel can function as a ditch sealer.

Utilizing adhesive in accordance with various embodiments of the present teachings can facilitate use of a roof panel and vehicle frame having a lower production cost (and created for attachment of the roof panel via continuous welding) in an assembly location that does not include equipment capable of continuous welding. Utilizing adhesive is suitable for low-volume applications (e.g., production of less than 26,000 vehicles per year) where investment in laser welding equipment would be prohibitive.

The embodiments described herein may permit the use of standardized parts efficiently at varying manufacturing volumes, while keeping the investment for the manufacturing process in line with manufacturing volumes. For instance, utilizing adhesive in accordance with the present teachings can allow standard panels, which have been designed to be used in a continuous laser welded uniform global design vehicle, to be used without modification in manufacturing facilities that are not able to employ continuous laser welding. For instance, a standard panel may be used without reshaping or resizing the standard panel. Processes that permit such standard panels to be used without modification to the panel may permit a global vehicle design to be manufactured in various facilities in different global locations while efficiently producing vehicles according to local markets and their respective volumes.

Alternatively, the embodiments described herein may employ a non-standard roof panel, such as a roof panel for a vehicle design desired in a given locality, but attach the roof panel without the need of laser welding, which may require a significant investment in capital and/or facility space. Such a roof panel for a local design may be, for example, a moon roof, such as a twin moon roof or a supersized moon roof, or may include other features a standardize roof panel does not possess, such as, for example, large holes for a telescopic mast utilized by emergency vehicles or television crews.

Although the present teachings can be employed in a manual application process, the present teachings can also be automated for higher volumes via the use of robotic adhesive dispensing and automated roof loading. An exemplary robotic adhesive dispensing method can include, for example, pedestal adhesive dispensing whereby a robot picks up a roof, positions it beneath an adhesive dispensing tip, and then loads the roof with applied adhesive directly onto the vehicle. The single-sided weld, such as a single-sided MFDC weld, could also be performed robotically using a welding tip, such as a water-cooled welding tip, a water-cooled welding tip being capable of achieving a higher duty cycle than an air-cooled welding tip.

In various embodiments, the adhesive could also be used to seal the roof ditch, thereby eliminating the need for roof ditch sealer. The weld pitch for weld bonding a roof attachment is traditionally, for example, about a 100 mm weld pitch. According to an exemplary embodiment, a process may use a weld pitch greater than, for example, approximately 370 mm and a total of approximately 5-8 welds per side of a vehicle roof panel. For instance, a single-sided weld can be used to augment the adhesive by holding the roof panel in position before and during the e-coat bake process. In various embodiments, the size and shape of the welds can be tuned to a joint geometry facilitating both ditched and ditchless roof designs.

Figure 1:
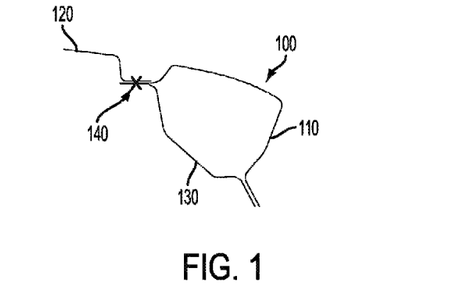
FIG. 1 is a partial cross-sectional view showing an exemplary embodiment of an attachment of a vehicle roof panel to a vehicle bodyside frame assembly.

FIG. 1 is a partial cross-sectional view showing an exemplary embodiment of a vehicle roof panel 120 attached to a vehicle bodyside frame assembly 100. The vehicle bodyside frame assembly 100 may include, for example, a bodyside outer panel 110 and a roof inner rail 130. In the illustrated embodiment, the roof panel 120 and vehicle bodyside frame assembly 100 are exposed at a bottom surface and a top surface, respectively, allowing attachment via a two-sided spot weld 140.

Figure 2:
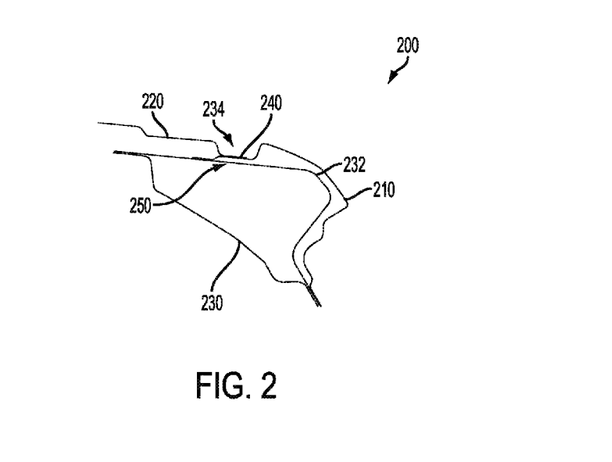
FIG. 2 is a partial cross-sectional view showing another exemplary embodiment of an attachment of a vehicle roof panel to a vehicle bodyside frame assembly.

FIG. 2 is a partial cross-sectional view showing another exemplary embodiment of an attachment of a vehicle roof panel 220 to a vehicle bodyside frame assembly 200. The vehicle bodyside frame assembly 200 may include, for example, a bodyside outer panel 210, a roof rail outer member 232, and a roof rail inner member 230. The bodyside outer panel 210, the roof rail outer member 232, and the roof rail inner member 230 may be attached at a lower area in a three-metal thickness stack via, for example, welding at a spot weld flange and/or a conventional spot weld pinch flange (not shown). An offset, or step, 234 and a lap joint flange of the roof rail outer member 232 can be utilized to attach the roof rail outer member 232 to the bodyside outer panel 210 via, for example, a spot weld flange and/or a conventional spot weld pinch flange (not shown). The roof rail outer member 232 may be attached to the roof rail inner member 230 with, for instance, a two-metal thickness stack at an upper portion via, for example, welding at a spot weld flange and/or a conventional spot weld pinch flange (not shown).

As shown in the exemplary embodiment of FIG. 2, the roof rail inner member 230 and/or the roof rail outer member 232 may create a closed section 250 that prohibits access to an underside of the roof panel attachment area (or "roof joint"). The roof panel 220 can therefore be attached to the offset or step 234 of the bodyside outer panel 210 using, for example, a continuous laser welded edge 240 or an adhesive in accordance with the present teachings.

Figure 3A:
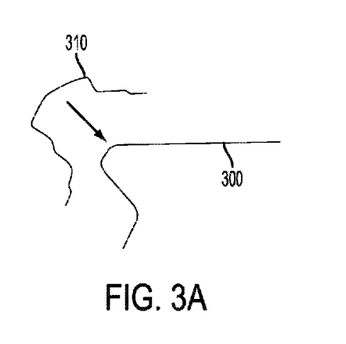
FIGS. 3A-3F are partial cross-sectional views showing an exemplary embodiment of an attachment of a vehicle roof panel to a vehicle bodyside frame assembly that can utilize an adhesive in accordance with the present teachings.
Figure 3B:
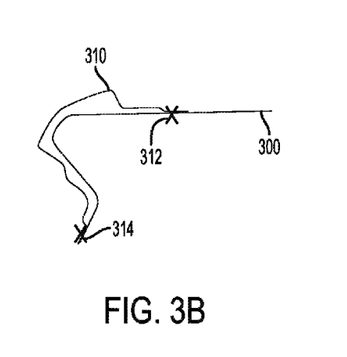
Figure 3C:
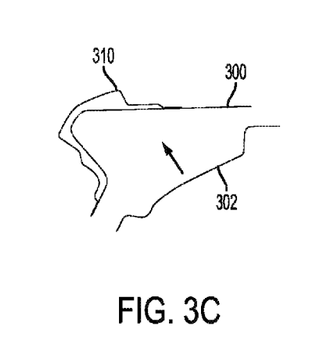
Figure 3D:
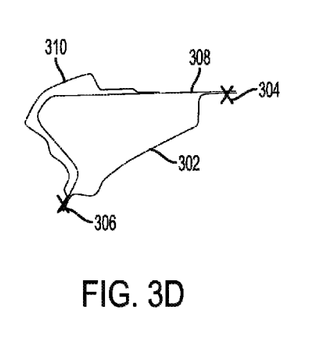

FIGS. 3A-3F are partial cross-sectional views showing an exemplary embodiment of an attachment of a vehicle roof panel to a vehicle frame that can utilize an adhesive in accordance with the present teachings. FIG. 3A shows assembly of a bodyside outer panel 310 to a roof rail outer member 300. FIG. 3B indicates locations for attachment (e.g., via conventional two-sided spot welding 312) of the body side outer panel 310 to the roof rail outer member 300. FIG. 3C shows assembly of a roof rail inner member 302 to the roof rail outer member 300, such as via one or more welds (not shown). FIG. 3D indicates locations for attachment (e.g., via conventional two-sided spot welds 304, 306) of the roof rail inner member 302 to the roof rail outer member 300.

Figure 3E:
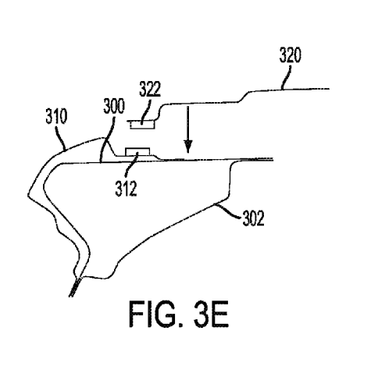

FIG. 3E shows assembly of a roof panel 320 onto the structure of FIG. 3D. As will be discussed below, the roof panel 320 may be attached to the structure of FIG. 3D, such as the bodyside outer panel 310, via one or more welds 340 and adhesive 330. As shown in the exemplary embodiment of FIG. 3E, adhesive may be applied to either or both of the roof panel 320 and the bodyside outer panel 310. For instance, adhesive 322 may be applied to only the roof panel 320, adhesive 312 may be applied to the bodyside outer panel 310, or adhesive 322, 312 may be applied to both the roof panel 320 and the bodyside outer panel 310. After the adhesive has been applied, the roof panel 320 may be placed in contact with the vehicle frame, such as in contact with the bodyside outer panel 310, as indicated in the exemplary embodiment of FIG. 302.

Figure 3F:
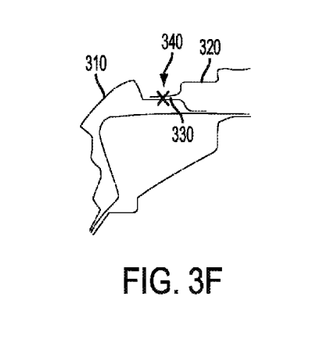

According to an embodiment, after the roof panel 320 has been placed in contact with the vehicle frame, such as the bodyside outer panel 310 with adhesive 330 in between, a weld 340 may be formed to join the roof panel 320 to the frame, such as the bodyside outer panel 310, as shown in the exemplary embodiment of FIG. 3F. The weld 340 may be, for example, one or more single-sided spot welds placed along an area of contact between the roof panel 320 and the vehicle frame, such as the bodyside outer panel 310. Further, the weld 340 may be formed through the adhesive 330, which may be in an uncured state, so that the relative positions between the roof panel 320 and the vehicle frame may be substantially maintained during subsequent processes during vehicle assembly, coating, and painting. For instance, weld 340 may be formed to substantially fix the position of the roof panel 320 to the vehicle frame so that the adhesive 330 may be subsequently cured during baking of an e-coat applied to the vehicle frame.

Figure 4:
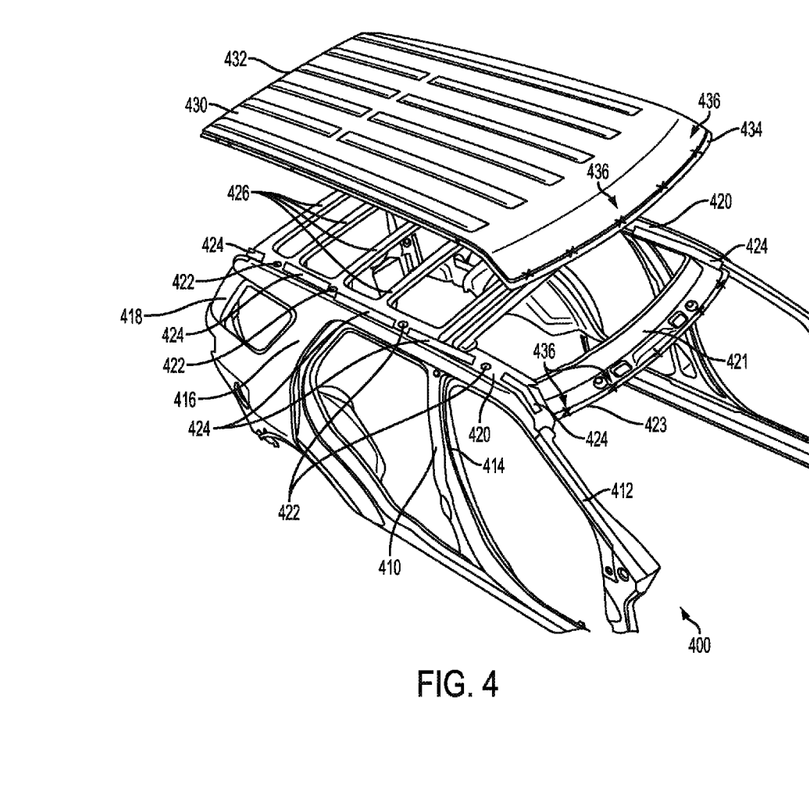
FIG. 4 is a top perspective view of an exemplary embodiment of an attachment of a vehicle roof panel to a vehicle bodyside frame that can utilize an adhesive in accordance with the present teachings.

FIG. 4 is a top perspective view of an exemplary embodiment of an attachment of a vehicle roof panel 430 to a vehicle frame using an adhesive in accordance with the present teachings. The vehicle frame may include, for example, a vehicle body side frame 410 that may form an A pillar 412, a B pillar 414, a C pillar 416, and a D pillar 418, connected via a roof rail 420. The vehicle roof rails 420 may be connected via a front header 421 having a weld flange 423 attached thereto, and a rear header (not shown) having a weld flange attached thereto. The roof rails 420 are also connected via roof bows 426, for instance four roof bows, as shown in the exemplary embodiment of FIG. 4. Each roof rail 420 can include at least one roof rail bolt hole 422, such as, for example, four to six roof rail bolt holes 422.

In certain embodiments of the present teachings, adhesive is applied to the roof rail 420 or to the roof panel 430 to join the roof panel 430 to the vehicle frame. For instance, adhesive may be applied in bond areas or lines 424, as shown in the exemplary embodiment of FIG. 4. Adhesive may be applied to the vehicle frame, such as to the roof rail 420, as indicated by bond areas 424 in FIG. 4, to the roof panel 430, or to both the roof panel 430 and the vehicle frame. The bond areas 424 may be arranged such that the adhesive does not contact a weld nut to be inserted into one or more of the bolt holes 422, for example by discontinuing application of the adhesive at, or in a region of, the bolt holes 422, as shown in FIG. 4.

As shown in the exemplary embodiment of FIG. 4, although an adhesive can be used to join the sides of the roof panel 430 to the vehicle frame, such as at bond areas 424, the flanges of the front and rear roof headers can be spot welded to the vehicle frame in a conventional manner. For instance, because the adhesive may be in an uncured state, spot welds may be used to substantially maintain the position of the roof panel 430 relative to the vehicle frame during subsequent processing, such as curing of the adhesive. According to an embodiment, the welds 436 between the front flange 434 of the roof panel 430 and the flange 423 of the front roof header 421 can be hidden beneath a windshield glazing flange (not shown). Welds on a flange 432 of the rear roof header (not shown can be hidden behind the tailgate or rear window flange (not shown).

In an exemplary process for attaching a roof panel to a bodyside panel of a vehicle frame in accordance with the present teachings, it may not be necessary to clean the roof panel and bodyside panel of stamping lubricant because the chosen adhesives are compatible with such oils. Of course such cleaning is optional if desired. The adhesive can then be manually applied (or applied via an automated process) to the roof rails and header flange of the vehicle frame and/or to the roof panel. The bolt holes used to secure the roof rails can be masked off, for example using a tape, to prevent adhesive from entering the bolt holes. Alternatively, a gap or adhesive skip could be used to prevent adhesive fouling the hole. For instance, a bead of adhesive (e.g., about a 5 mm diameter bead of adhesive) can then be dispensed on the bodyside panel and the tape removed prior to loading the roof panel onto the vehicle frame. A locator pin 508 can be used in one of the rear roof rail holes to help align the roof panel with the vehicle frame, as shown in the exemplary embodiment of FIG. 5. The roof panel can then be lowered onto the vehicle frame and secured to the vehicle frame (e.g., via single-sided spot welds as discussed above).

Figure 5:
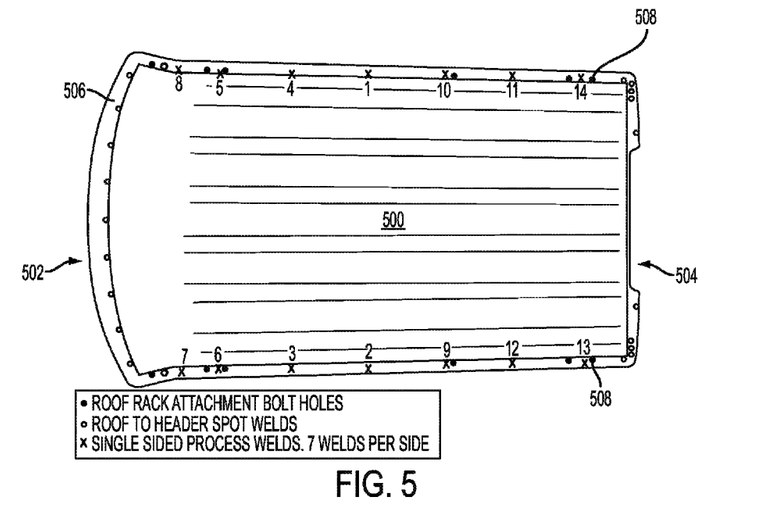
FIG. 5 is a top view of an exemplary embodiment vehicle roof panel showing possible locations and sequence for temporary/supplemental attachment of the roof panel to the vehicle bodyside frame.

FIG. 5 is a top view of a vehicle roof panel 500 showing an embodiment of exemplary attachment locations and an exemplary sequence for temporary attachment (e.g., via single-sided spot welding as discussed above) of the roof panel 500 to the vehicle body frame. In the illustrated exemplary embodiment, the attachment sequence can start in a center of the roof panel 500 at attachment location 1 shown in FIG. 5, and progress toward a front 502 of the roof panel 500 at locations 2 through 8 shown in FIG. 5. Attachment can then continue from the center of the roof panel 500 and progress toward a rear 504 of the roof panel 500 at locations 9 through 14 shown in FIG. 5. Thus, the exemplary embodiment includes 14 attachment locations, 7 being on each side of the roof panel 500. The exemplary attachment sequence shown in FIG. 5 is non-limiting and exemplary only, and the present disclosure is not limited to a particular number, location, and/or attachment sequence. However, the exemplary arrangement and sequence shown in FIG. 5 may assist in eliminating "puckering" of certain roof panels by initially welding at the center of the sides of the roof panel 500. A typical roof panel can have a length from front to rear of, for example, about 2.3 meters, substantially the entire length being bonded to the vehicle frame on each side by an adhesive.

A front portion or flange 506 of the roof panel 500 can be secured to the vehicle along a weld flange of the vehicle front header using, for example, traditional two-sided resistance spot welds (when appropriate access is available), single-sided spot welds, with or without an adhesive. Similarly, the rear portion or flange 504 of the roof panel 500 can be secured to the vehicle along a weld of the vehicle rear header using, for example, traditional two-sided resistance spot welds (when appropriate access is available), single-sided spot welds, or an adhesive. Exemplary locations for such front and rear roof panel attachment welds are illustrated in FIG. 5.

In various embodiments of the present teachings, such as the exemplary embodiment of FIG. 5, the structure of the vehicle frame may allow access for conventional two-sided spot welds at one or more locations along each side of the roof panel. Certain embodiments of the present teachings contemplate utilizing conventional two-sided spot welds at available locations to supplement the adhesive bond of the roof panel.

FIG. 6 is a partial view of an attachment of a roof panel 600 to a vehicle bodyside frame, such as a bodyside outer panel 610. The bodyside outer panel 610 and the roof panel 600 are shown, along with a single-sided spot weld 612, and a portion of adhesive 614 that is visible from having been squeezed from between the roof panel 600 and the bodyside outer panel 610 when the roof was loaded onto the vehicle frame and spot welded thereto. The present teachings contemplate an application of adhesive (e.g., an amount, type, and location of the adhesive) that minimizes and even prevents adhesive from escaping from a joint between the roof panel 600-bodyside outer panel 610 to become visible. The present teaching also contemplate filling the roof ditch with a flowable sealer for sealing and aesthetics, although the adhesive of the present teachings can, in some embodiments, provide adequate sealing. The roof panel can comprise, for example, a cold rolled steel (CRS) uncoated panel.

Figure 7:
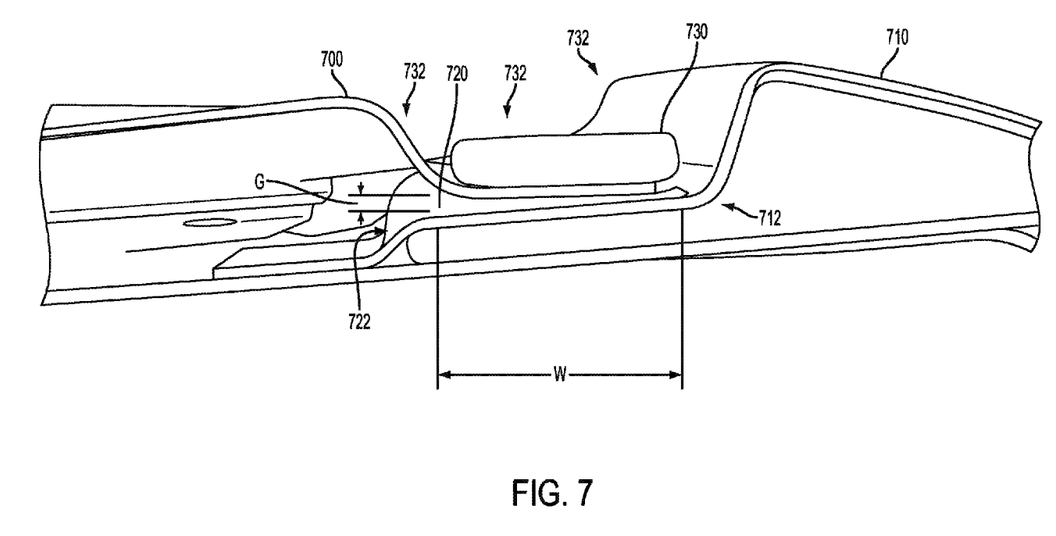
FIG. 7 is a partial cross-sectional view of an exemplary embodiment attachment of a roof panel to a vehicle bodyside frame using an adhesive in accordance with an exemplary embodiment of the present teachings.

FIG. 7 is a partial cross-sectional view of an attachment of a roof panel 700 to a vehicle body frame, such as a bodyside outer panel 710, using an adhesive in accordance with an exemplary embodiment of the present teachings. As can be seen, the roof panel 700 can be set atop a stepped portion 712 of the bodyside outer panel 710 of the vehicle frame. The roof panel 700 can have an angle α of with respect to the step 712 (which, in a laser welded application, can aid the laser welding process via the venting of any gases that form). In various exemplary embodiments, the angle α may be about 5° or less, for example, the angle α may be about 3°. An adhesive 720 used in accordance with the present teachings can fill a gap G resulting from the angle α between the roof panel 700 and the bodyside outer panel 710, to form a wedge section of adhesive 720. The gap G where the wedge section of adhesive 720 is located may have a thickness at one side of, for example, of 1.6 mm or less, for example about 1 mm, tapering down to zero thickness at the other side, as shown in the exemplary embodiment of FIG. 7. A squeezed-out portion 722 of the adhesive 720 may occur when the roof panel 700 is joined to the bodyside outer panel 710. In accordance with certain embodiments of the present teachings, the roof panel 700 can overlap the bodyside outer panel 710 over a width W of, for example, greater than approximately 10 mm, for example, about 17 mm. Ditch sealer 730 can be added to the ditch 732, as shown in FIG. 7. For instance, ditch sealer 730 may be added after the adhesive 720 has cured.

The roof panel 700 can comprise, for example, a galvanized steel that is electro-galvanized, that is clean and unpolished. The roof panel 700 can alternatively comprise cold rolled steel that is clean and unpolished. The roof panel 700 may have a thickness of, for example, ranging from approximately 0.55 mm to approximately 0.85 mm. The bodyside outer panel 710 thickness can range, for example, ranging from approximately 0.55 mm to approximately 0.85 mm.

While the present teachings have been disclosed in terms of exemplary embodiments in order to facilitate better understanding of the present teachings, it should be appreciated that the present teachings can be embodied in various ways without departing from the principle of the teachings. Therefore, the present teachings should be understood to include all possible embodiments which can be embodied without departing from the principle of the teachings set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present teaching. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

The present teachings also contemplate utilizing adhesives in accordance with the present teachings to facilitate unique joint designs currently constrained by the laser welding process, as would be appreciate by those skilled in the art.

What is claimed is:

1. A method for attaching a roof panel to a roof rail of a vehicle bodyside frame, the method comprising:
applying a single-component adhesive to a roof rail or to a portion of a roof panel that rests on the roof rail, wherein the roof rail prohibits access to an underside of an area at which the roof panel is configured to attach to the roof rail;
placing the roof panel onto the roof rail;
subsequent to applying the adhesive, attaching the roof panel to the roof rail using single-sided spot welds;
heating the roof panel and vehicle bodyside frame to a temperature that cures the single-component adhesive.

2. The method of claim 1, wherein the single-component adhesive is utilized to bond the roof panel to a bodyside outer panel of a vehicle bodyside frame.

3. The method of claim 1, wherein the single-component adhesive is toughened.

4. The method of claim 3, wherein the single-component adhesive is toughened with an additive.

5. The method of claim 3, wherein the toughness has a peel strength of about 50 Newtons per one-inch wide strip of adhesive.

6. The method of claim 1, wherein the heating step to cure the single-component adhesive is a step for baking a paint applied to the vehicle bodyside frame.

7. The method of claim 1, wherein the single-component adhesive cures at a temperature of more than about 150° C. for about 5 minutes to about 10 minutes.

8. The method of claim 1, wherein the single-component adhesive cures at a temperature of more than about 171° C. for about 5 minutes to about 10 minutes.

9. The method of claim 1, wherein an adhesive curing schedule includes curing at 171° C. metal temperature for 10 minutes.

10. The method of claim 1, wherein an adhesive curing schedule includes curing at 205° C. metal temperature for 30 minutes.

11. A method for assembling a vehicle comprises:
assembling a vehicle bodyside frame such that a portion of the bodyside frame prevents access to an underside of a body side panel of the body side frame configured to be connected to a roof panel;
applying a single-component adhesive to at least one of the body side panel of the vehicle bodyside frame and the roof panel;
putting the roof panel on the vehicle bodyside frame;
attaching the roof panel to the vehicle bodyside frame;
e-coating the assembled vehicle with an e-coat; and
baking the assembled vehicle at a temperature of more than approximately 150° C. for approximately 5 minutes to approximately 1 hour to cure the single-component adhesive.

12. The method of claim 11, wherein attaching the roof panel to the body side panel of the vehicle bodyside frame comprises attaching the roof panel to a roof rail of the bodyside frame using at least one single-sided spot weld.

13. The method of claim 1, wherein the single-component adhesive is toughened.

14. The method of claim 13, wherein the single-component adhesive is toughened with an additive.

15. The method of claim 13, wherein the toughness has a peel strength of about 50 Newtons per one-inch wide strip of adhesive.

16. The method of claim 11, wherein the single-component adhesive cures at a temperature of more than approximately 150° C. to approximately 230° C. for a time period ranging from approximately 5 minutes to approximately 1 hour.

17. The method of claim 11, wherein the baking step to cure the single-component adhesive is a step for baking the e-coat.

18. The method of claim 11, wherein the single-component adhesive is a single-component epoxy resin adhesive.

19. The method of claim 11, wherein the roof rail comprises bolt holes and the method comprises preventing the adhesive from entering the bolt holes of the roof rail.

20. The method of claim 11, wherein the roof panel is a standard roof panel configured for laser welding attachment to a vehicle bodyside frame.

21. The method of claim 20, wherein the roof panel is not modified prior to the attaching of the roof panel to the vehicle bodyside frame.

* * * * *